(12) United States Patent
Ma et al.

(10) Patent No.: US 12,124,502 B2
(45) Date of Patent: Oct. 22, 2024

(54) METHOD AND APPARATUS FOR PREPARING IMAGE ON CLOUD PLATFORM, AND DEVICE AND STORAGE MEDIUM

(71) Applicant: INSPUR SUZHOU INTELLIGENT TECHNOLOGY CO., LTD., Jiangsu (CN)

(72) Inventors: Aoyu Ma, Jiangsu (CN); Kaiyuan Qi, Jiangsu (CN); Bao Ma, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/247,168

(22) PCT Filed: Jul. 30, 2021

(86) PCT No.: PCT/CN2021/109519
§ 371 (c)(1),
(2) Date: Mar. 29, 2023

(87) PCT Pub. No.: WO2022/088810
PCT Pub. Date: May 5, 2022

(65) Prior Publication Data
US 2023/0385334 A1 Nov. 30, 2023

(30) Foreign Application Priority Data
Oct. 29, 2020 (CN) .......................... 202011182679.2

(51) Int. Cl.
*G06F 16/583* (2019.01)
*G06F 16/535* (2019.01)

(52) U.S. Cl.
CPC .......... *G06F 16/583* (2019.01); *G06F 16/535* (2019.01)

(58) Field of Classification Search
CPC ...... G06F 16/164; G06F 3/0665; G06F 3/067; G06F 16/13; G06F 16/182; G06F 16/188; H04L 67/1097
See application file for complete search history.

(56) References Cited

U.S. PATENT DOCUMENTS 9,824,095 B1 * 11/2017 Taylor .................... G06F 16/11
707/737
10,055,139 B1 * 8/2018 Bent ...................... G06F 3/0611
707/737
(Continued)

FOREIGN PATENT DOCUMENTS

CN 107197022 A 9/2017
CN 107888695 A 4/2018
(Continued)

OTHER PUBLICATIONS

Kong et al. "Multi-level image software assembly technology based on OpenStack and Ceph", IEEE (Year: 2016).*
(Continued)

*Primary Examiner* — Yuk Ting Choi
(74) *Attorney, Agent, or Firm* — Dennemeyer & Associates LLC; Victoria Friedman

(57) ABSTRACT

A method and apparatus for preparing an image on a cloud platform, and a device and a storage medium are provided. The method may include: receiving an image request for a target object, and obtaining a first storage backend of the target object according to the image request; obtaining a second storage backend of a Glance service in the cloud platform, and comparing the second storage backend with the first storage backend; and obtaining an image for the target object on the second storage backend in a cloning manner when the first storage backend is the same as the second storage backend. According to the method, when the first storage backend is the same as the second storage
(Continued)

backend, the image for the target object is obtained on the second storage backend in the cloning manner, so that the downloading and uploading processes are omitted.

16 Claims, 5 Drawing Sheets

(56) References Cited

U.S. PATENT DOCUMENTS

| | | | | |
|---|---|---|---|---|
| 2019/0004844 A1* | 1/2019 | Zhang | ................ | G06F 9/45558 707/737 |
| 2019/0079804 A1* | 3/2019 | Thyagarajan | ......... | G06F 9/5077 707/737 |

FOREIGN PATENT DOCUMENTS

| | | | |
|---|---|---|---|
| CN | 109344006 A | | 2/2019 |
| CN | 109634718 A | | 4/2019 |
| CN | 110750334 A | | 2/2020 |
| CN | 110825498 A | * | 2/2020 |
| CN | 111262934 A | * | 6/2020 |
| CN | 112463170 A | | 3/2021 |
| WO | 2017129106 A1 | | 8/2017 |

OTHER PUBLICATIONS

Zhang et al. 110825498 (Year: 2020) Translation.*
Wang et al. 11126934 (Year: 2020) Translation.*
Search report for PCT/CN2021/109519 mailed Nov. 3, 2021.
Search report for Chinese application 202011182679.2, filed Oct. 29, 2020.

* cited by examiner

Computer-readable storage medium

METHOD AND APPARATUS FOR PREPARING IMAGE ON CLOUD PLATFORM, AND DEVICE AND STORAGE MEDIUM

CROSS-REFERENCE TO RELATED APPLICATIONS

The present disclosure is a National Stage Filing of the PCT International Application No. PCT/CN2021/109519 filed on Jul. 30, 2021, which claims priority to China Patent Application No. 202011182679.2, filed on Oct. 29, 2020 in China National Intellectual Property Administration and entitled "METHOD AND APPARATUS FOR PREPARING IMAGE ON CLOUD PLATFORM, AND DEVICE AND STORAGE MEDIUM", which is hereby incorporated by reference in its entirety.

FIELD OF THE INVENT

The present disclosure relates to the technical field of cloud platforms, in particular, to a method and apparatus for preparing an image on a cloud platform, and a computer device and a storage medium.

BACKGROUND OF THE INVENTION

On a cloud platform based on multiple architectures, Glance is an important component in OpenStack, and provides image (also referred to as mirror) storage services for OpenStack. With the help of Glance, when a cloud host or a system disk is created, a system image may be conveniently provided. On an operating system of the cloud platform, a user may conveniently upload an image through the Glance service, and the image will be finally stored on a corresponding storage backend through a driver for future use by the user. The image may be used for creating a cloud host.

At present, there are usually two methods for preparing an image on a cloud platform. The first method is to directly start a cloud host through an image. The second method is to download an image to a cloud hard disk which is used as a system disk to directly start a cloud host. In a case where a cloud host is created by using either of the above two methods, after a user uses the cloud host for a period of time and installs many other programs based on the image, the user may intend to prepare a new image through the current cloud host or system disk for later use. On a current cloud platform, if a cloud host is started by a cloud hard disk, an image may be directly exported based on a system disk, but this operation requires a long time even if the system disk and the image storage backend are located in the same bottom layer storage. This long time is caused by the following complicated process: cinder-volume (Cinder is a service that provides block storage in the cloud platform (such as OpenStack), and various relevant drives of a target storage platform is installed in a cinder-volume container, so that the configuration of the architecture is optimized) invokes a bottom-layer storage drive corresponding to the system disk, data of the system disk needs to be completely downloaded to a temporary folder on a cinder-volume host machine of the cloud platform, the system disk is then uploaded to a glance storage backend through a glance REST Application Programming Interface (API) (which is an interface of a GLANCE service), and temporary files are then deleted. If a cloud host is started by an image, the image needs to be completely downloaded to a temporary folder on a nova-compute (a portal for managing and configuring virtual machines) host machine, then the temporary image is uploaded to a glance storage back end through a glance REST API, and then the temporary image is deleted. It may be seen that the processes of the above two methods for preparing the image are extremely cumbersome and complex, and downloading and uploading operations are very time-consuming, and the efficiency of image preparing is low.

BRIEF SUMMARY OF THE INVENTION

In view of this, it is necessary to provide a method and apparatus for preparing an image on a cloud platform, and a computer device and a storage medium, which may reduce downloading and uploading time and improve the efficiency of an image preparing service.

According to a first aspect of the embodiments of the present disclosure, a method for preparing an image on a cloud platform is provided, including:
  receiving an image request for a target object, and obtaining a first storage backend of the target object according to the image request;
  obtaining a second storage backend of a Glance service in the cloud platform, and comparing the second storage backend with the first storage backend; and
  obtaining an image for the target object on the second storage backend in a cloning manner when the first storage backend is the same as the second storage backend.

In some embodiments, the method may further include:
parsing a storage pool corresponding to the second storage backend; and
obtaining a usage status of the target object;
wherein obtaining the image for the target object on the second storage backend in the cloning manner when the first storage backend is the same as the second storage backend may include: when the first storage backend is the same as the second storage backend, and the target object is in a non-used state, obtaining the image for the target object on the second storage backend in the cloning manner; and when the first storage backend is the same as the second storage backend, and the target object is in a used state, snapshooting the target object on the second storage backend, and obtaining, after the snapshooting is completed, the image for the target object in the cloning manner.

In some embodiments, the operation of obtaining the image for the target object on the second storage backend in the cloning manner may include:
  cloning the target object to the storage pool corresponding to the second storage backend to obtain a target image, and flattening the target image; and
  updating metadata of the target image after flattening, to obtain the image for the target object.

In some embodiments, the target object is a system disk; and the operation of receiving the image request for the target object, and obtaining the first storage backend of the target object according to the image request may include:
  receiving an image creation request for the system disk via a Cinder service interface in the cloud platform; and
  sending a message to a storage backend of the system disk to obtain a bottom-layer storage backend of the system disk, and determining the bottom-layer storage backend of the system disk as the first storage backend.

In some embodiments, the target object is a cloud host; and the operation of receiving the image request for the target object, and obtaining the first storage backend of the target object according to the image request may include:

receiving an image creation request for the cloud host via a Nova service interface in the cloud platform; and querying a database for a position of the cloud host, and parsing the location of the cloud host to obtain a bottom-layer storage backend of the cloud host, and determining the bottom-layer storage backend of the cloud host as the first storage backend.

In some embodiments, the operation of obtaining the second storage backend of the Glance service in the cloud platform may include:

invoking an interface of the Glance service in the cloud platform, and reading a storage configuration of the Glance service to obtain an image location; and parsing the image location to obtain image backend port information, and determining the second storage backend according to the image backend port information.

In some embodiments, the method may further include:

obtaining, when the first storage backend is different from the second storage backend, an image for the target object by downloading the target object to the cloud platform; and invoking an interface of the Glance service of the cloud platform to upload the image for the target object in the cloud platform to the second storage backend.

According to a second aspect of the embodiments of the present disclosure, an apparatus for preparing an image on a cloud platform is provided, including:

a first storage backend obtaining module, configured to receive an image request for a target object, and obtain a first storage backend of the target object according to the image request;

a second storage backend obtaining module, configured to obtain a second storage backend of a Glance service in the cloud platform, and compare the second storage backend with the first storage backend; and a cloning module, configured to obtain an image for the target object on the second storage backend in a cloning manner when the first storage backend is the same as the second storage backend.

According to a third aspect of the embodiments of the present disclosure, a computer device is further provided. The computer device may include:

at least one processor; and a memory, storing a computer program operable on the processor, the processor, when executing the program, implementing the foregoing method for preparing an image on a cloud platform.

According to a fourth aspect of the embodiments of the present disclosure, a computer-readable storage medium is further provided. The computer-readable storage medium stores a computer program which, when executed by a processor, implements the foregoing method for preparing an image on a cloud platform.

According to the method for preparing an image on a cloud platform, the first storage backend of the target object is obtained according to the received image request, and the second storage backend of the Glance service in the cloud platform is obtained. When the first storage backend is the same as the second storage backend, the image for the target object is obtained on the second storage backend in the cloning manner, so that the downloading and uploading processes are omitted, the time for preparing the image may be greatly shortened, a bandwidth load of a service network may also be reduced, and the efficiency of image preparing may be remarkably improved.

In addition, the embodiments of the present disclosure provide an apparatus for preparing an image on a cloud platform, a computer device and a computer-readable storage medium, which may also achieve the above technical effect. This will not be repeated here again.

BRIEF DESCRIPTION OF THE DRAWINGS

In order to describe the embodiments of the present disclosure or the technical solutions in the related art more clearly, drawings required to be used in the embodiments or the illustration of the related art will be briefly introduced below. Obviously, the drawings in the illustration below are only some embodiments of the present disclosure. Those having ordinary skill in the art also may acquire other embodiments according to these drawings without creative effort.

DETAILED DESCRIPTION OF THE INVENTION

To make the objectives, technical solutions and advantages of the present disclosure clearer, embodiments of the present disclosure are further described below in detail in combination with exemplary embodiments and with reference to accompanying drawings.

It should be noted that all the expressions of "first" and "second" in the embodiments of the present disclosure are used to distinguish two different entities with same names or two different parameters. It may be seen that "first" and "second" are only for the convenience of expression, and should not be understood as limiting the embodiments of the present disclosure. The subsequent embodiments will not provide repeated explanation at each occurrence of such expressions.

Figure 1:
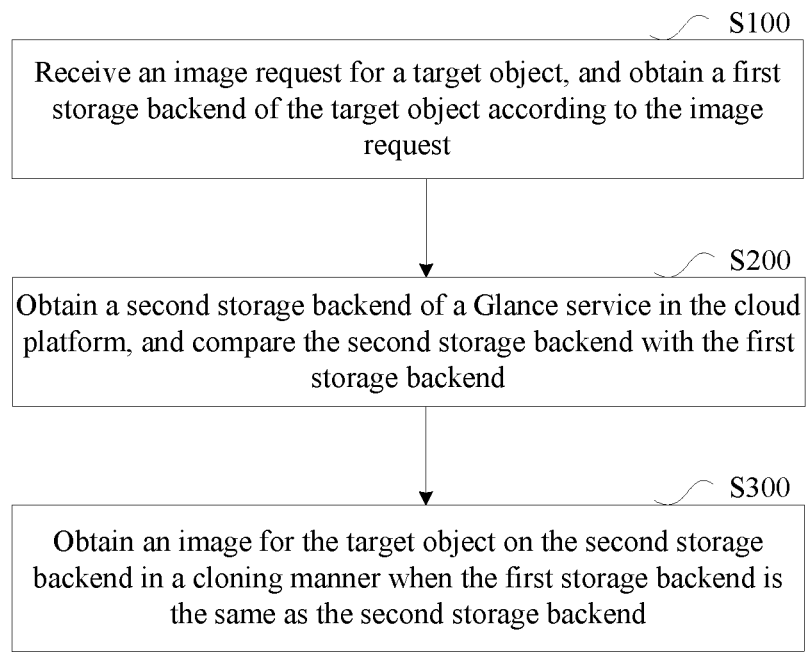
FIG. 1 is a flow diagram of a method for preparing an image on a cloud platform according to some embodiments of the present disclosure.

In some embodiments, FIG. 1 shows a flow diagram of a method for preparing an image on a cloud platform. According to the method for preparing an image on a cloud platform of the embodiments of the present disclosure, the cloud platform is based on multiple architectures. The cloud platform achieves unified management and scheduling of various virtualizations on X86 and ARM architectures among different hardware architectures by using a computing service. In the embodiments, the method may include the following operations S100 to S300.

At S100, an image request for a target object is received, and a first storage backend of the target object is obtained according to the image request.

At S200, a second storage backend of a Glance service in the cloud platform is obtained, and the second storage backend is compared with the first storage backend.

Glance is an important component in OpenStack. It provides image storage services for OpenStack. When a cloud host or a system disk is created, a system image may be conveniently provided. A Glance-API is extended for the Glance service to provide a new interface, i.e., a get_store_cfg interface. An image location is obtained by reading a glance-store (image storage) configuration, and the image location is parsed to obtain relevant information of an image backend, such as host, fsid and pools.

S300, an image for the target object is obtained on the second storage backend in a cloning manner when the first storage backend is the same as the second storage backend.

According to the method for preparing an image on a cloud platform, the first storage backend of the target object is obtained according to the received image request, and the second storage backend of the Glance service in the cloud platform is obtained. When the first storage backend is the same as the second storage backend, the image for the target object is obtained on the second storage backend in the cloning manner, so that the downloading and uploading processes are omitted, the time for preparing the image may be greatly shortened, a bandwidth load of a service network may also be reduced, and the efficiency of image preparing may be remarkably improved.

In some exemplary embodiments, the method for preparing an image on a cloud platform provided in the present disclosure may further include the following operations.

At S410, a storage pool corresponding to the second storage backend is parsed.

At S420, a usage status of the target object is obtained.

The operation S300 in which the image for the target object is obtained on the second storage backend in the cloning manner when the first storage backend is the same as the second storage backend may further include following operations S430 and S440.

At S430, when the first storage backend is the same as the second storage backend, and the target object is in a nonused state, the image for the target object is obtained on the second storage backend in the cloning manner.

At S440, when the first storage backend is the same as the second storage backend, and the target object is in a used state, the target object is snapshot on the second storage backend, and the image for the target object is obtained in the cloning manner after the snapshooting is completed.

In some exemplary embodiments, the foregoing operation S300 may include the following sub-operations S310 and S320.

At S310, the target object is cloned to the storage pool corresponding to the second storage backend to obtain a target image, and the target image is flattened.

At S320, metadata of the target image after flattening is updated, to obtain the image for the target object.

In some exemplary embodiments, the target object is a system disk; and the operation S100 may include following operations S110A and S120A.

At S110A, an image creation request for the system disk is received via a Cinder service interface in the cloud platform, where Cinder is a service that provides block storage in the cloud platform (such as OpenStack).

At S120A, a message is sent to a storage backend of the system disk to obtain a bottom-layer storage backend of the system disk, and the bottom-layer storage backend of the system disk is determined as the first storage backend.

In some exemplary embodiments, the target object is a cloud host, and the operation S100 may include following operations S110B and S120B.

At S110B, an image creation request for the cloud host is received via a Nova service interface in the cloud platform, where Nova is a service that provides computation in The cloud platform (such as OpenStack).

At S120B, a database is queried for a location of the cloud host, and the location of the cloud host is parsed to obtain a bottom-layer storage backend of the cloud host; and the bottom-layer storage backend of the cloud host is determined as the first storage backend.

In some exemplary embodiments, the foregoing operation S200 may include the following sub-operations S210 and S220.

At S210, an interface of the Glance service in the cloud platform is invoked, and a storage configuration of the Glance service is read to obtain an image location.

At S220, the image location is parsed to obtain image backend port information, and the second storage backend is determined according to the image backend port information.

In some exemplary embodiments, the method for preparing an image on a cloud platform based on the foregoing embodiment may further include the following operations S510 and S520.

At S510, when the first storage backend is different from the second storage backend, an image for the target object is obtained by downloading the target object to the cloud platform.

At S520, an interface of the Glance service of the cloud platform is invoked to upload the image for the target object in the cloud platform to the second storage backend.

Figure 2:
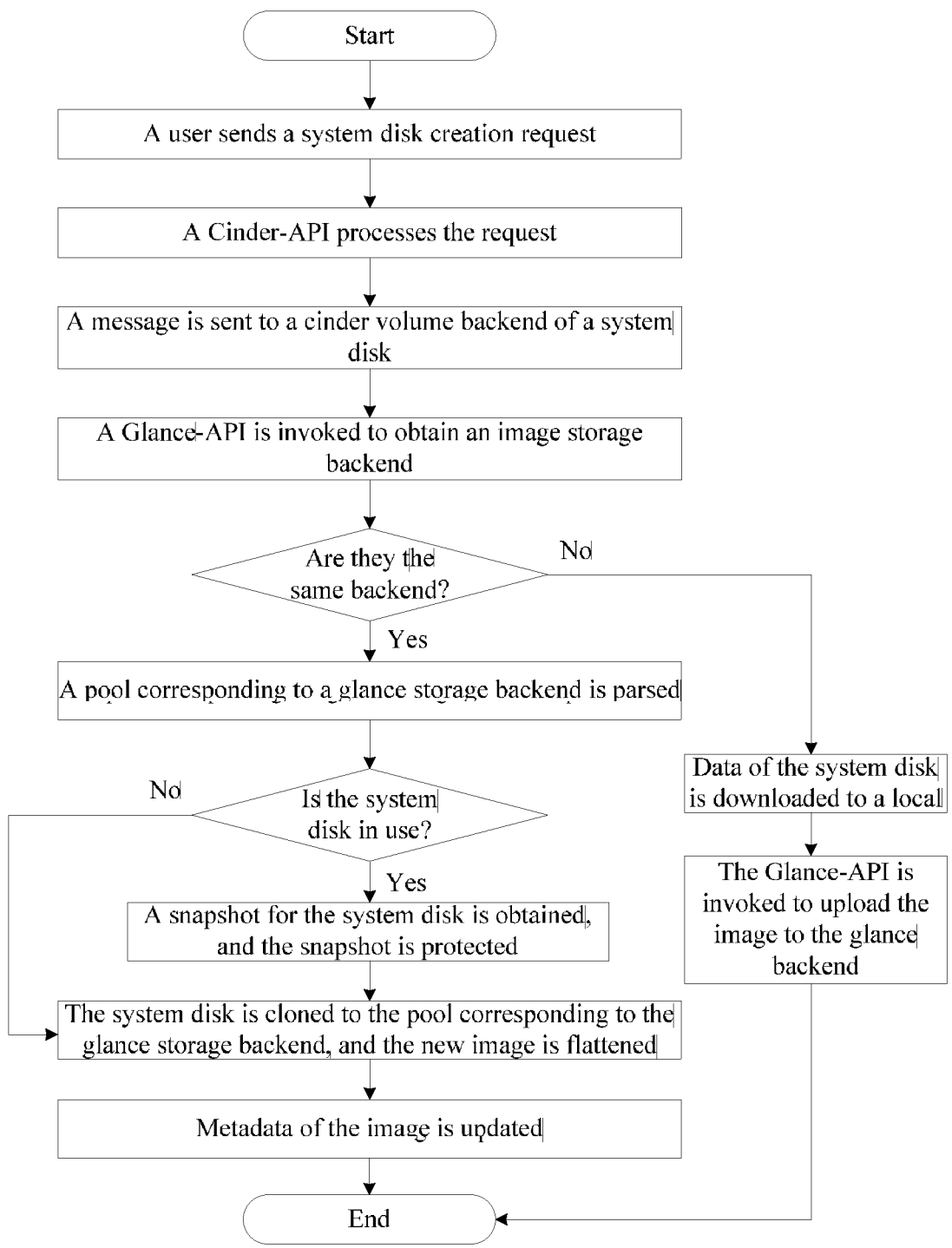
FIG. 2 is a flow diagram of preparing an image for a system disk according to some embodiments of the present disclosure.

In some other exemplary embodiments, FIG. 2 shows a flow diagram of preparing an image for a system disk. In order to facilitate understanding the technical solution of the embodiments of the present disclosure, an example in which the system disk is used as the target object is described below. The method for preparing the image for the system disk may include the following operations A1 to A4.

At A1, a Glance-API is extended so as to provide a new interface, i.e., a get_store_cfg interface; an image location is obtained by reading a glance-store (image storage) configuration, and the image location is parsed to obtain relevant information of an image backend, such as host, fsid and pools.

At A2, a Cinder-API receives an image preparing request, obtains a bottom-layer storage backend (backend_name) corresponding to the system disk, and then invokes an interface copy_volume_to_image of a corresponding driver, to obtain a system disk backend.

At A3, an image backend location is obtained by invoking the Glance-API extended in operation A1.

At A4, the image backend location obtained in operation A3 is compared with the system disk backend obtained in operation A2, and an image is prepared according to a comparison result which may include the following three specific cases. In the first case, the backend obtained in operation A2 and the backend obtained in operation A3 are the same backend, and the system disk is in use, a snapshot for the system disk in use is first obtained and then protected, the system disk is cloned to the image, the image is then flattened, and finally, the image location and the metadata are updated. In the second case, the backend obtained in operation A2 and the backend obtained in operation A3 are the same backend, and the system disk is not in use at present, the system disk is directly cloned to the image, the image is then flattened, and the image location and the metadata are then updated. In the third case, the backend obtained in operation A2 and the backend obtained in operation A3 are different backends, data of the system disk is downloaded to a local of the cloud platform, and the interface (Glance-API) of the Glance service is invoked to upload the image of the local of the cloud platform to a Glance service backend.

Figure 3:
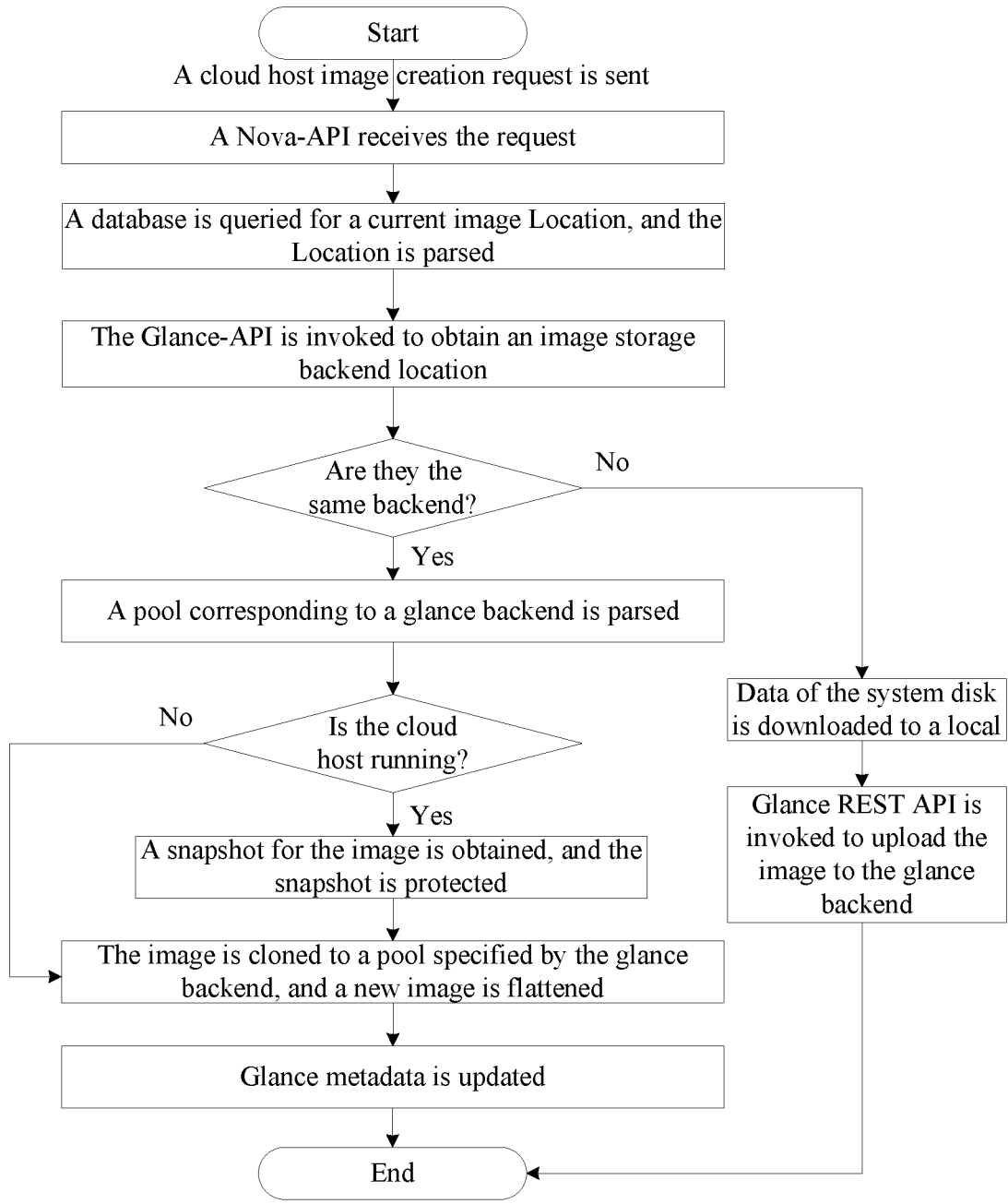
FIG. 3 is a flow diagram of preparing an image for a cloud host according to some embodiments of the present disclosure.

In some other exemplary embodiments. FIG. 3 shows a flow diagram of preparing an image for a cloud host. In order to facilitate understanding the technical solution of the present disclosure, an example in which the cloud host is used as the target object is described below: The method for preparing the image for the cloud host may include the following operations B1 to B3.

At B1, a Glance-API is extended so as to provide a new interface, i.e., a get_store_cfg interface; an image location is obtained by reading a glance-store (image storage) configuration, and the image location is parsed to obtain relevant information of an image backend, such as host, fsid and pools.

At B2, a Novaf service interface (Nova-API) receives an image preparing request, and obtains a bottom-layer storage backend (backend_name) corresponding to the image of the cloud host and a storage pool, to obtain a cloud host backend.

A Cinder-API receives an image preparing request, obtains a bottom-layer storage backend (backend_name) corresponding to the system disk, and then invokes an interface copy_volume_to_image of a corresponding driver.

At B3, a Nova service obtains an image backend location through the extended Glance interface.

At B4, the image backend location obtained in operation B3 is compared with the cloud host backend obtained in operation B2, and an image is prepared according to a comparison result which may include the following three specific cases. In the first case, the backend obtained in operation B2 and the backend obtained in operation B3 are the same backend, and the cloud host is running, a snapshot for the cloud host that is running is first obtained and then protected, the cloud host is cloned to the image, the image is then flattened, and finally, the image location and the metadata are updated. In the second case, the backend obtained in operation B2 and the backend obtained in operation B3 are the same backend, and the cloud host is not running at present, the cloud host is directly cloned to the image, the image is then flattened, and the image location and the metadata are then updated. In the third case, the backend obtained in operation B2 and the backend obtained in operation B3 are different backends, data of the cloud host is downloaded to a local of the cloud platform, and the interface (Glance-API) of the Glance service is invoked to upload the image of the local of the cloud platform to a Glance service backend.

The above method for preparing an image on a cloud platform extends the Glance service interface, so that for different target objects, when a target object storage backend and a storage backend of a Glance service are the same, the time of downloading and uploading for image preparing within the platform may be reduced, a bandwidth of a service network may be saved, and the service efficiency may be improved.

Figure 4:
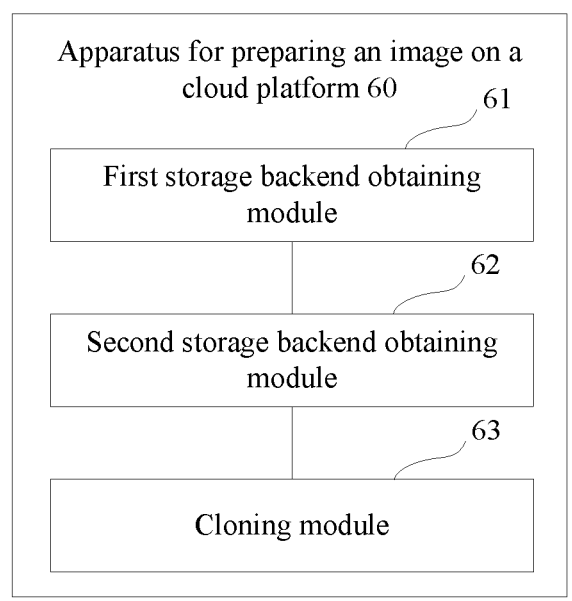
FIG. 4 is a schematic structural diagram of an apparatus for preparing an image on a cloud platform according to some embodiments of the present disclosure.

In some other exemplary embodiments, as shown in FIG. 4, an apparatus 60 for preparing an image on a cloud platform includes:

a first storage backend obtaining module 61, configured to receive an image request for a target object, and obtain a first storage backend of the target object according to the image request;

a second storage backend obtaining module 62, configured to obtain a second storage backend of a Glance service in the cloud platform, and compare the second storage backend with the first storage backend; and a cloning module 63, configured to obtain an image for the target object on the second storage backend in a cloning manner when the first storage backend is the same as the second storage backend.

It should be noted that for further exemplary implementations on the apparatus for preparing an image on a cloud platform, reference could be made to the above method for preparing an image on a cloud platform. The various modules in the apparatus for preparing an image on a cloud platform may be realized in whole or in part by software, hardware and a combination of software and hardware. The above modules may be embedded in or independent of a processor in a computer device in the form of hardware, or may be stored in a memory in the computer device in the form of software, so that it is convenient for the processor to invoke and execute operations corresponding to the above modules.

Figures 5, 6:
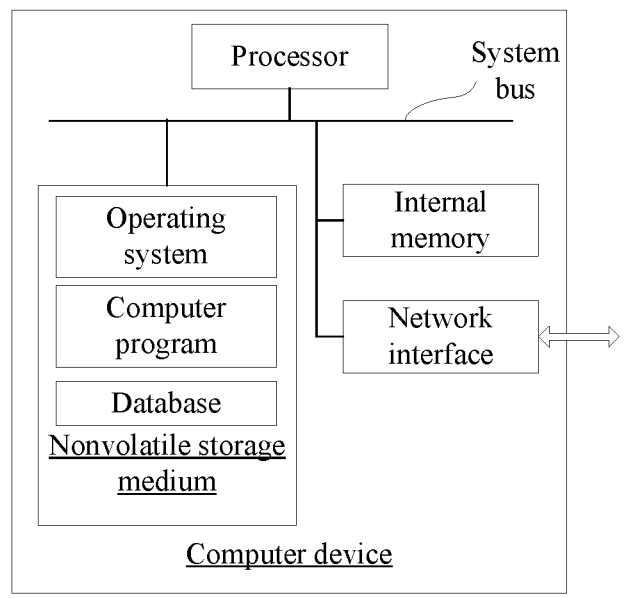
FIG. 5 is a diagram of an internal structure of a computer device according to some embodiments of the present disclosure.
FIG. 6 is a schematic diagram of a computer-readable storage medium according to some embodiments of the present disclosure.

According to another aspect of the embodiments of the present disclosure, a computer device is provided. The computer device may be a server. FIG. 5 shows a diagram of an internal structure of the computer device. The computer device may include a processor, a memory; a network interface and a database which are connected through a system bus. The processor of the computer device is configured to provide computing and control capabilities. The memory of the computer device may include a nonvolatile storage medium and an internal memory. The nonvolatile storage medium stores an operating system, a computer program and a database. The internal memory provides an environment for running of the operating system and a computer program in the nonvolatile storage medium. The database of the computer device is configured to store data. The network interface of the computer device is used for communicating with an external terminal through network connection. The computer program, when executed by the processor, implements the method for preparing an image on a cloud platform.

According to still another aspect of the embodiments of the present disclosure, a computer-readable storage medium is provided. Referring to FIG. 6, the computer-readable storage medium stores a computer program. The computer program, when executed by the processor, implements the method for preparing an image on a cloud platform.

Those having ordinary skill in the art can understand that implementation of all or a part of the processes in the method of the foregoing embodiment may be completed by a computer program that instructs relevant hardware. The computer program may be stored in a nonvolatile computer-readable storage medium. The computer program may include the processes of the embodiments of the foregoing methods when executed. Any reference to the memory, the storage, the database or other media used in the embodiments provided by the present disclosure may include nonvolatile and/or volatile memories. The nonvolatile memories may include a read-only memory (ROM), a programmable ROM (PROM), an electrically programmable ROM (EPROM), an electrically erasable programmable ROM (EEPROM) or a flash memory. The volatile memories may include a random access memory (RAM) or an external cache. As an illustration but not a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct memory bus dynamic RAM (DRDRAM), and a memory bus dynamic RAM (RDRAM).

The technical features of the embodiments described above may be arbitrarily combined. In order to make the description concise, all possible combinations of various technical features in the above embodiments are not completely described. However, the combinations of these technical features should be considered as the scope described in the present specification as long as there is no conflict.

The above embodiments only express several implementations of the present disclosure, and their descriptions are more specific and detailed, but they cannot be understood as limiting the patent scope of the invention. It should be noted that those having ordinary skill in the art may further make variations and improvements without departing from the conception of the present disclosure, and these variations and improvements all fall within the protection scope of the present disclosure. Therefore, the patent protection scope of the present disclosure should be subject to the appended claims.

What is claimed is:

1. A method for preparing an image on a cloud platform, performed by a computer device and comprising:
    receiving an image request for a target object, and obtaining a first storage backend of the target object according to the image request, wherein the target object is a system disk or the target object is a cloud host;
    obtaining a second storage backend of a Glance service in the cloud platform, and comparing the second storage backend with the first storage backend; and
    obtaining an image for the target object on the second storage backend in a cloning manner when the first storage backend is the same as the second storage backend;
    further comprising:
    parsing a storage pool corresponding to the second storage backend; and
    obtaining a usage status of the target object;
    wherein obtaining image for the target object on the second storage backend in the cloning manner when the first storage backend is the same as the second storage backend comprises:
    when the first storage backend is the same as the second storage backend, and the target object is in a non-used state, obtaining the image for the target object on the second storage backend in the cloning manner; and
    when the first storage backend is the same as the second storage backend, and the target object is in a used state, snapshooting the target object on the second storage backend, and obtaining, after the snapshooting is completed, the image for the target object to the cloning manner.

2. The method according to claim 1, wherein obtaining image for the target object on the second storage backend in the cloning manner comprises:
    cloning the target object to the storage pool corresponding to the second storage backend to obtain a target image, and flattening the target image; and
    updating metadata of the target image after flattening, to obtain the image for the target object.

3. The method according to claim 1, wherein when the target object is the system disk, receiving the image request for the target object, and obtaining the first storage backend of the target object according to the image request comprises:
    receiving an image creation request for the system disk via a Cinder service interface in the cloud platform; and
    sending a message to a storage backend of the system disk to obtain a bottom-layer storage backend of the system disk, and determining the bottom-layer storage backend of the system disk as the first storage backend.

4. The method according to claim 1, wherein when the target object is the cloud host receiving the image request for the target object, and obtaining the first storage backend of the target object according to the image request comprises:
    receiving an image creation request for the cloud host via a Nova service interface in the cloud platform; and
    querying a database for a position of the cloud host, and parsing the location of the cloud host to obtain a bottom-layer storage backend of the cloud host, and determining the bottom-layer storage backend of the cloud host as the first storage backend.

5. The method according to claim 1, wherein obtaining the second storage backend of the Glance service in the cloud platform comprises:
    invoking an interface of the Glance service in the cloud platform, and reading a storage configuration of the Glance service to obtain an image location; and
    parsing the image location to obtain image backend port information, and determining the second storage backend according to the image backend port information.

6. The method according to claim 5, wherein a Glance-API is extended for the Glance service to provide the interface of the Glance service in the cloud platform.

7. The method according to claim 1, further comprising:
    obtaining, when the first storage backend is different from the second storage backend, an image for the target object by downloading the target object to the cloud platform; and
    invoking an interface of the Glance service of the cloud platform to upload the image for the target object in the cloud platform to the second storage backend.

8. The method according to claim 1, wherein the cloud platform is OpenStack; and the Glance service is used for providing image storage services for the OpenStack.

9. The method according to claim 1, wherein obtaining the image for the target object on the second storage backend in the cloning manner comprises:
    cloning the target object to the storage pool corresponding to the second storage backend to obtain a target image, and flattening the target image; and
    updating metadata of the target image after flattening, to obtain the image for the target object.

10. A computer device, comprising:
    at least one processor; and
    a memory, the memory storing a computer program operable in the processor, and the processor, when executing the program, is configured to:
    receive an image request for a target object, and obtain a first storage backend of the target object according to the image request, wherein the target object is a system disk or the target object is a cloud host;
    obtain a second storage backend of a Glance service in the cloud platform, and compare the second storage backend with the first storage backend; and obtain an image for the target object on the second storage backend in a cloning manner when the first storage backend is the same as the second storage backend;

wherein the processor, when executing the program, is further configured to:

parse a storage pool corresponding to the second storage backend; and obtain a usage status of the target object;

wherein the processor, when obtaining the image for the target object on the second storage backend in the cloning manner when the first storage backend is the same as the second storage backend, is configured to:

when the first storage backend is the same as the second storage backend, and the target object is in a non-used state, obtain the image for the target object on the second storage backend in the cloning manner; and when the first storage backend is the same as the second storage backend, and the target object is in a used state, snapshot the target object on the second storage backend, and obtain, after the snapshooting is completed, the image for the target object in the closing manner.

11. The computer device according to claim 10, wherein the processor, when obtaining the image for the target object on the second storage backend in the cloning manner, is configured to:

clone the target object to the storage pool corresponding to the second storage backend to obtain a target image, and flatten the target image; and update metadata of the target image after flattening, to obtain the image for the target object.

12. The computer device according to claim 10, wherein the processor, when obtaining the image for the target object on the second storage backend in the cloning manner, is configured to:

clone the target object to the storage pool corresponding to the second storage backend to obtain a target image, and flatten the target image; and update metadata of the target image after flattening, to obtain the image for the target object.

13. The computer device according to claim 10, wherein when the target object is the system disk, the processor, when receiving the image request for the target object, and obtaining the first storage backend of the target object according to the image request, is configured to:

receive an image creation request for the system disk via a Cinder service interface in the cloud platform; and send a message to a storage backend of the system disk to obtain a bottom-layer storage backend of the system disk, and determine the bottom-layer storage backend of the system disk as the first storage backend.

14. The computer device according to claim 10, wherein when the target object is the cloud host, the processor, when receiving the image request for the target object, and obtaining the first storage backend of the target object according to the image request, is configured to:

receive an image creation request for the cloud host via a Nova service interface in the cloud platform; and query a database for a position of the cloud host, and parse the location of the cloud host to obtain a bottom-layer storage backend of the cloud host, and determine the bottom-layer storage backend of the cloud host as the first storage backend.

15. The computer device according to claim 10, wherein the processor, when obtaining the second storage backend of the Glance service in the cloud platform, is configured to:

invoke an interface of the Glance service in the cloud platform, and read a storage configuration of the Glance service to obtain an image location; and parse the image location to obtain image backend port information, and determine the second storage backend according to the image backend port information.

16. A non-transitory computer-readable storage medium, the computer-readable storage medium storing a computer program, wherein the computer program, when executed by a processor, causes the processor to:

receive an image request for a target object, and obtain a first storage backend of the target object according to the image request, wherein the target object is a system disk or the target object is a cloud host;

obtain a second storage backend of a Glance service in the cloud platform, and compare the second storage backend with the first storage backend; and obtain an image for the target object on the second storage backend in a cloning manner when the first storage backend is the same as the second storage backend, wherein the computer program, when executed by the processor, causes the processor to further, parse a storage pool corresponding to the second storage backend, and obtain a usage status of the target object;

wherein the computer program, when executed by the processor to obtain image for the target object on the second storage backend in the cloning manner when the first storage backend is the same as the second storage backend, causes the processor to:

when the first storage backend is the same as the second storage backend, and the target object is in a non-used state, obtain the image for the target object on the second storage backend in the cloning manner; and when the first storage backend is the same as the second storage backend, and the target object is in a used state, snapshot the target object on the second storage backend, and obtain, after the snapshot is completed, the image for the target object in the cloning manner.

* * * * *